United States Patent [19]

Stemmle et al.

[11] Patent Number: 5,077,614
[45] Date of Patent: Dec. 31, 1991

[54] SCANNER WITH DOCUMENT AND COPY SHEET REGISTRATION MEANS

[75] Inventors: Denis J. Stemmle; Robert Robideau, both of Webster, N.Y.

[73] Assignee: Xerox Corporation, Stamford, Conn.

[21] Appl. No.: 547,272

[22] Filed: Jul. 2, 1990

[51] Int. Cl.⁵ .................. H04N 1/028; H04N 1/034; H04N 1/10; B65H 9/06
[52] U.S. Cl. .................................. 358/296; 358/472; 358/497; 358/498; 355/75; 355/231; 355/317; 271/245
[58] Field of Search ............... 358/296, 472, 498, 497, 358/401, 494; 355/72, 75, 317, 230, 231, 308; 400/630, 631, 632, 632.1; 346/140 R; 271/245, 246, 253, 254

[56] References Cited

U.S. PATENT DOCUMENTS

| | | | |
|---|---|---|---|
| 4,146,326 | 3/1979 | Taylor | 355/75 |
| 4,412,734 | 10/1981 | Shibuya . | |
| 4,424,524 | 7/1982 | Daniele . | |
| 4,496,984 | 1/1985 | Stoffel . | |
| 4,557,473 | 12/1985 | Pecak . | |
| 4,583,126 | 4/1986 | Stoffel . | |
| 4,636,871 | 1/1987 | Oi . | |
| 4,849,788 | 7/1989 | Prebola . | |

Primary Examiner—Benjamin R. Fuller
Assistant Examiner—Scott A. Rogers

[57] ABSTRACT

A combined input scanner and output scanner has a frame assembly, a document transport to transport a document through the scanner in a path in a first direction and, a copy sheet transport to transport a copy sheet through the scanner a document registration means and a copy sheet registration means, the document registration gate including a cover pivotally mounted on the machine for movement between an open and closed position over the document transport path, said cover having at least one document registration gate adjacent its downstream end which extends into the document transport path to register the lead edge of a document when the cover is in the open position, the copy sheet registration means including at least one copy sheet registration gate in the copy sheet transport path to register the lead edge of a copy sheet when said cover is in the open position. The cover has a tab for removing the at least one copy sheet registration gate from the copy sheet transport when the cover is in the closed position over the document transport path.

26 Claims, 8 Drawing Sheets

SCANNER WITH DOCUMENT AND COPY SHEET REGISTRATION MEANS

CROSS REFERENCE TO RELATED APPLICATIONS

Attention is directed to my copending application Ser. No. 257,366 entitled Simultaneous Read/Write Copier filed Oct. 13, 1988. Attention is also directed to copending application Ser. No. 547,887 entitled Compact Multimode Input and Output Scanner; Ser. No. 547,264 entitled Compact Read/Write Scanner; and Ser. No. 547,275 entitled Platen Accessory For Portable Copier all filed concurrently herewith and commonly assigned.

BACKGROUND OF THE INVENTION

The present invention relates to a very low cost portable compact scanner employing a single scanning carriage incorporating a reading head and a printing head to permit essentially simultaneous reading and writing of an original document and a copy. More particularly it is directed to document and copy sheet registration for such a scanner.

Historically, copies of original documents have been produced by a xerographic process wherein the original document to be copied is placed on a transparent platen, either by hand or automatically through the use of a document handler, and the original document illuminated by a relatively high intensity light. Image rays reflected from the illuminated document are focused by a suitable optical system onto a previously charged photoconductor, the image light rays functioning to discharge the photoconductor in accordance with the image content of the original to produce an electrostatic latent image of the original on the photoconductor. The electrostatic latent image so produced is thereafter developed by a suitable developer material commonly referred to as toner, and the developed image transferred to a sheet of copy paper brought forward by a suitable feeder. The transferred image is thereafter fixed to the copy paper by fusing to provide a permanent copy while the photoconductor is cleaned of residual developer preparatory to recharging. More recently, interest has arisen in electronic imaging where, in contrast to the aforedescribed xerographic system, the image of the document original is converted to electrical signals or pixels and these signals, which may be processed, transmitted over long distances, and/or stored, are used to produce one or more copies. In such an electronic imaging system, rather than focusing the light image onto a photoreceptor for purposes of discharging a charged surface prior to xerographic development, the optical system focuses the image rays reflected from the document original onto the image reading array which serves to convert the image rays to electrical signals. These signals are used to create an image by some means such as operating a laser beam to discharge a xerographic photoreceptor, or by operating some direct marking system such as an ink jet or thermal transfer printing system.

It is generally advantageous if the normally separate document reading and copy printing operations could be combined. If some of these reading/writing functions could be combined, system operation and synchronization could be simplified and system cost reduced through the use of fewer parts.

There are systems in the prior art that address the above identified concerns. For example:

U.S. Pat. No. 4,496,984 to Stoffel and U.S. Pat. No. 4,583,126, a division of the above-identified reference, disclose an input/output scanner for simultaneously reading a document and writing a copy. The document and copy sheet are fed in back to back relation to the read/write station. A monolithic full width reading array reads each line in two steps, to improve resolution. The writing array consists of rows of ink jet nozzles, of which the number and disposition is in direct correspondence to the sensors of the read bar.

U.S. Pat. No. 4,424,524 to Daniele discloses a full width read/write LED array for scanning a document in the read mode or exposing the photoreceptor in the write mode. A Selfoc optical fiber lens array is used for focusing the full width LED array on the document or photoreceptor.

A difficulty with these prior art systems is the complexity and cost of separate components such as the complex optics, photoreceptor and developer in a typical xerographic process such as the Daniele system. In other systems such as the Stoffel system, it is necessary for an operator to manually combine a document and copy sheet into a single unit for manual insertion to the machine feed rolls. Such a system also has a significant cost penalty associated with components such as the monolithic full width reading array.

In the above cross reference application entitled "Compact Multimode Input and Output Scanner" Ser. No. 547,887 an input output scanner concept is described wherein a single pair of paper path rolls drive both the document at the 12 o'clock position and the copy paper at the 6 o'clock position and the circumference of the roll was equal to the width of the input and the output chips. The scanning carriage has secured thereto a reading head and a printing head which carriage system scans across a document scanning a band of information across the document and printing a band of information across a copy sheet. The carriage system has a separate indexing mechanism to index the scanning carriage to a second position to scan another band of information across the document.

Between imaging scans both the paper and the document are advanced exactly the same amount by one complete revolution of the drive rolls thus eliminating the need for tight control of the run out tolerances on the rolls thereby insuring lower costs for the parts. The advantages of such an architecture could be lost if the copy sheet and document have to be driven by larger diameter rolls or by separate rolls which may be required where either or both the input and output chip are vertically oriented and have a dimension greater than the width of the scanning path. The present invention is directed to an alternate architecture directed to minimizing such difficulties as well as providing a copy sheet and document registration system to enable such a system.

PRIOR ART

U.S. Pat. No., 4,412,73454 to Shibuya et al. discloses a copier which has a two part paper registration guide which is joined together when an upper frame is shut. See column 3, lines 39–50.

U.S. Pat. No. 4,557,473 to Pecak discloses a sheet decelerating a stopping apparatus which uses a pivoting member to correctly register a sheet. More specifically, the pivoting member can be moved between an inoperative position and a registering position. See column 3, lines 29-33. The apparatus uses a solenoid to actuate the pivoting member. See column 4, lines 30-35.

U.S. Pat. No. 4,849,788 to Prebola discloses a dual mode document registration and edge guide which is raised automatically in response to lifting the document feeder and is depressed below the platen by movement of the feeder toward the platen.

SUMMARY OF THE INVENTION

In accordance with the principle aspect of the present invention a combined input and output scanner comprising a frame assembly a document transport to transport a document through the machine in a path in a first direction and a copy sheet transport to transport a copy sheet through the machine in a path is provided with a document registration and copy sheet registration means including a cover pivotally mounted on the machine for movement between an open and a closed position over the document transport path and having at least one integral document registration gate which extends into the document transport path to register the lead edge of a document when the cover is in the open position.

In a further aspect of the present invention the copy sheet registration includes at least one copy sheet registration gate positioned in the copy sheet transport path normally urged into the copy sheet transport path to register the lead edge of a copy sheet when the cover is in the open position, the cover having means associated therewith for removing the copy sheet registration gate from the copy sheet transport path when the cover is in the closed position over the document transport path.

In a further aspect of the present invention the cover is pivotally mounted at the downstream end of the document transport path and the integral document registration gate is adjacent the covers downstream end.

In a further aspect of the present invention the copy sheet transport path is in a direction opposite the direction of the document transport and at least one copy sheet registration gate is positioned at the downstream end of and spring biased into the copy sheet transport path.

In a further aspect of the present invention the copy sheet registration gate has a positioning tab for engagement with a positioning tab on the cover.

In a further aspect of the present invention the document transport and copy sheet transport include a first pair of synchronously driven rotatable drive rolls, each drive roll forming a feeding nip for a document with a document feed idler roll and a feeding nip for a copy sheet with a copy sheet feed idler roll.

In a further aspect of the present invention the document feed nip is on top of the drive roll and the copy sheet feed nip is at the bottom of the drive roll.

In a further aspect of the present invention the copy sheet feed idler roll in the upstream end of the copy sheet transport path is mounted on arm for pivotal movement toward one of the drive rolls forming a feeding nip there between and away from the drive roll to enable insertion of a copy sheet there between.

In a further aspect of the present invention the copy sheet feed idler roll is rotatably mounted on one end of the arm and the copy sheet registration gate is mounted on the other end of the arm and the arm is pivotally mounted between them for alternate insertion of the registration gate in the copy sheet transport path and engagement of the copy sheet feed idler roll with the drive roll.

In a further aspect of the present invention a scanning carriage is movably mounted in the frame for scanning movement in a scanning path in a direction transverse to the first and opposite direction and the scanning carriage includes a comounted reading head for scanning a document to produce a digital image of at least a portion of the document and a printing head for relative movement with respect to a copy sheet and electrically connected to the reading head for printing a digital image on a copy sheet.

In a further aspect of the present invention when the carriage scans a document the reading head scans a band of information across the document and the printing head essentially simultaneously prints the same band of information across a copy sheet and upon completion of the scanning movement the document transport and the copy sheet transport simultaneously index the document and copy sheet through their respective paths a distance equal to the width of the band of information before the carriage scans another band of information across the document.

In a further aspect of the present invention the drive rolls have a circumference equal to the width of the band of information.

In a further aspect of the present invention the reading head includes an input chip and the printing head includes an output chip and the input and output chips are comounted in a horizontal array in a vertical plane to the same planar substrate.

BRIEF DESCRIPTION OF THE DRAWINGS

For a better understanding of the present invention reference is had to the accompanied drawings wherein the reference numerals have been applied to the same parts in several figures.

DESCRIPTION OF PREFERRED EMBODIMENT

Figure 6A:
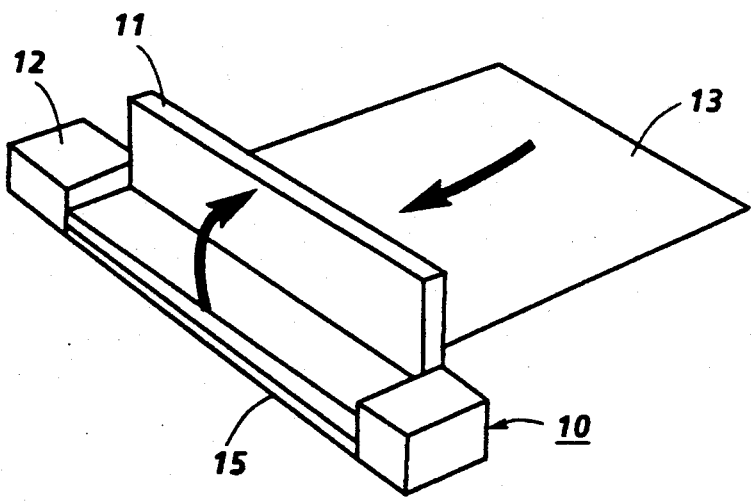
FIG. 6A, 6B, and 6C are three isometric views illustrating the general operation of the compact copier.
Figure 6B:
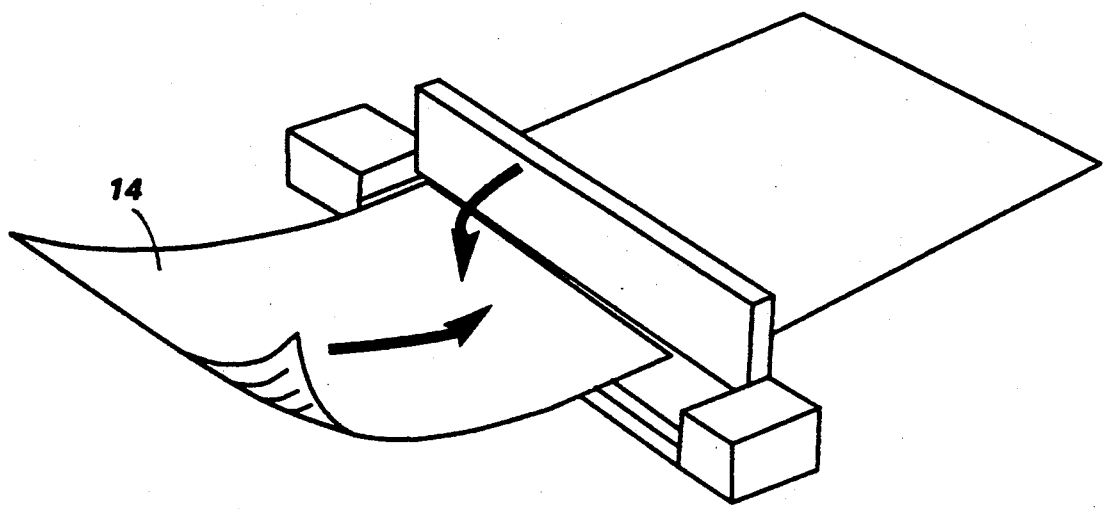
Figure 6C:
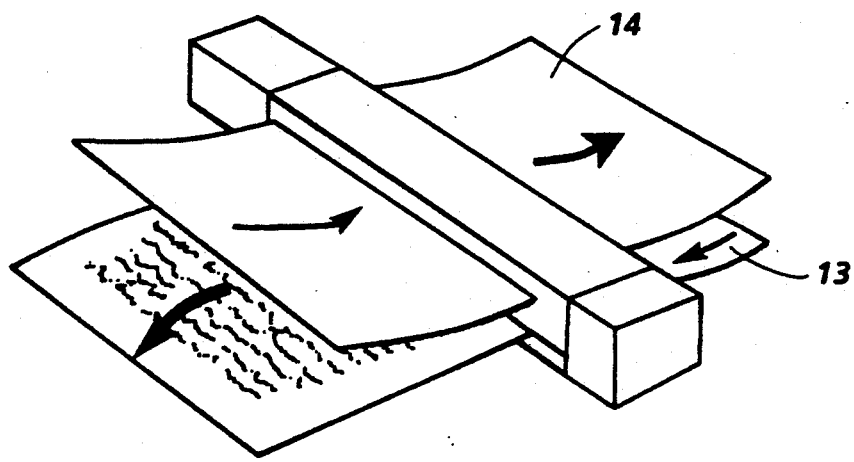

Referring now to FIG. 6A, 6B and 6C a general overview of the compact portable copier according to the present invention is provided. The copier is generally illustrated as comprising a frame assembly 15 having a maintenance station 12 at one end and a top cover 11 pivotally mounted to the frame assembly. To make a copy of document 14 the top cover is rotated to the open position as shown in FIG. 6A, copy sheet 13 is inserted at the entrance of the copy sheet transport path and the document 14 is inserted against a registration stop member in the top cover after which the top cover is closed and the copying sequence begins by the scanning carriage scanning a band of information across the document. During the scanning operation the image on the document is digitized by an input digitizing system and in the preferred embodiment a digital image is essentially simultaneously printed by a printing system on the copy sheet. Subsequently, the document is indexed to the right and the copy sheet is indexed to the left to enable the scanning carriage to scan a second band of information in the reverse scanning direction across the document. The distance of the indexing of both the document and copy sheet is the width of the band of information across the document.

Referring to FIGS. 1, 2, 4 and 8 of the drawings there is shown a combined input scanner and output scanner designated generally by reference numeral 10. The scanner 10 includes a frame assembly 15 composed of a base unit 18, rails 19 within which scanning carriage 20 is transported during its scanning path. When not in scanning operation the scanning carriage 20 is parked in the maintenance station 12 where it is protected from contamination and maintained in a relatively constant environment.

The scanning carriage 20 includes an array of light emitting diodes 21 mounted to substrate 52 which is typically ceramic or planar plastic, and has a heat sink 54 built into its rear portion. Input and control chip 26 and ink jet chip 27, are comounted in the same plane to the same planer substrate 52. During the operation the scanning carriage scans a document which is in an image plane and prints on the copy sheet which is in the printing plane parallel to the image plane. The planar substrate to which the input chip and output chip are comounted is perpendicular to both the image plane and the printing plane. Power is provided to the substrate by connector 53. The chip substrate is mounted to the scanning carriage 20 by means of docking pins 56 cooperating with docking holes 57. When assembled, the document can be scanned with the image being reflected by mirror 22 through half-lens 23 back to the input and the control chip 26 which can essentially simultaneously activate the ink jet chip 27. This arrangement enables the input chip and the ink jet chip to be mounted on the same planer substrate, thereby substantially reducing mechanical tolerance requirements. This configuration also enables the input chip and ink jet chip and possibly all control chips to be combined into a single chip.

The substrate may be made of any suitable planar material. Typical materials include plastic and ceramics such as alumina which are mechanically stable with good heat transfer and thermal expansion properties.

This assembly scans or reads document originals 14 the image area being converted to electric image signals or pixels. The image signals generated by the reading head are input to a print bar 25 such as chips 27 which may be any suitable direct imaging device such as a thermal transfer head or preferably a thermal ink jet array 27 to write copies of the document originals in accordance with the image signals onto a suitable substrate or copy sheet 13. It will be understood that while reference has been made to input and output chips, ink jet arrays etc., that the present invention is directed in a more generic sense to the mounting of solid state devices with input reading elements and solid state devices with output printing elements. It will be understood that the number of scanning elements or sensors that comprise the image read bar 17 determine the initial scanning resolution while the number of ink jet nozzles 25 that comprise the print bar 27 determine the resolution of the image copy. In a preferred embodiment the number of input scanning elements equals the number of output printing elements. Both the scanning head and the print head are secured for movement on scanning carriage 20 which is mounted for forward and backward bi-directional scanning movement in a scanning path along the length of the frame assembly by means of scan stepper motor 32 through gear 31 pulleys 29 and 30 and cable 28 to move the scanning carriage in the rails 19.

Figure 7:
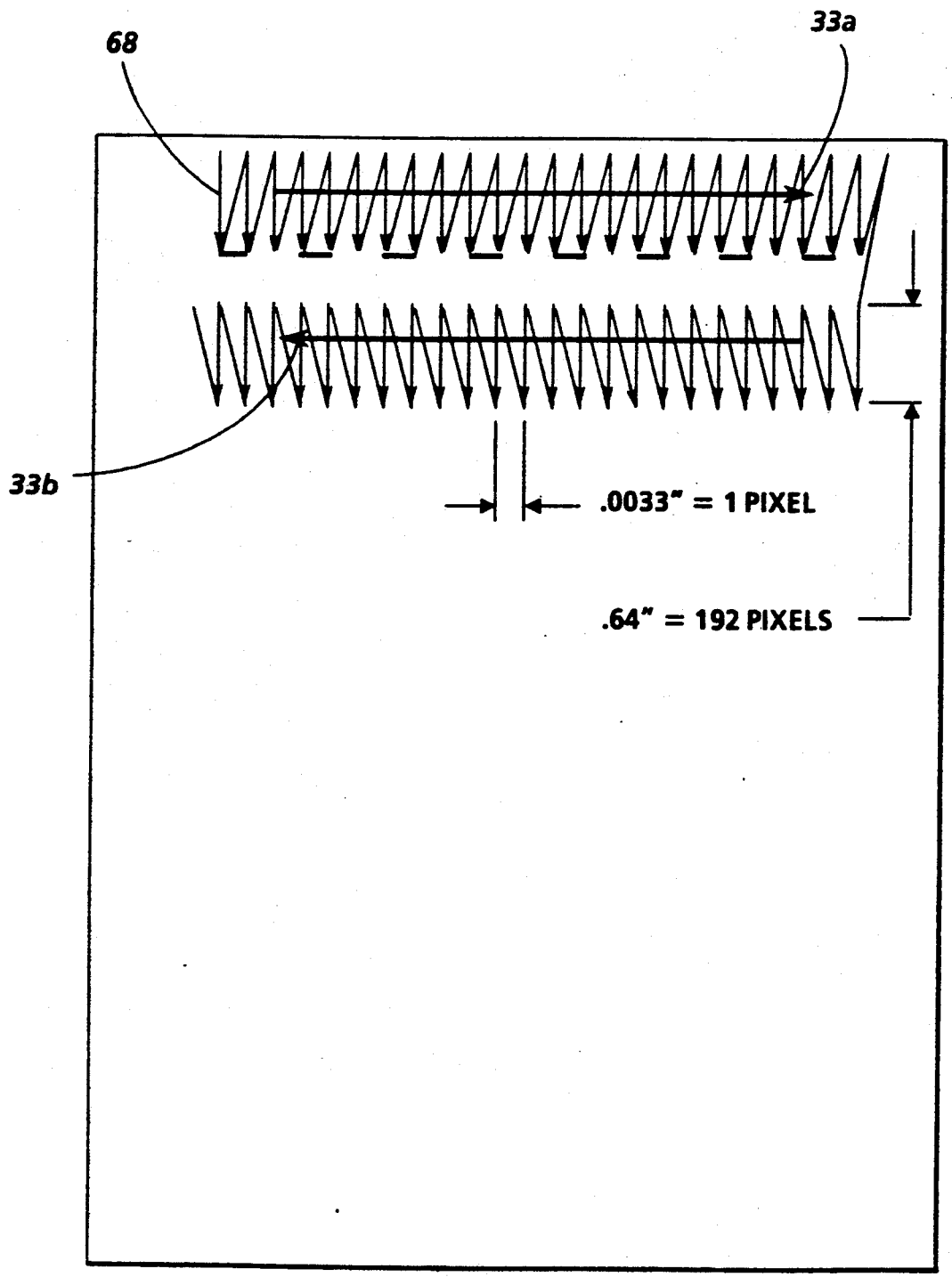
FIG. 7 is an illustration of the scanning operation.
Figure 8:
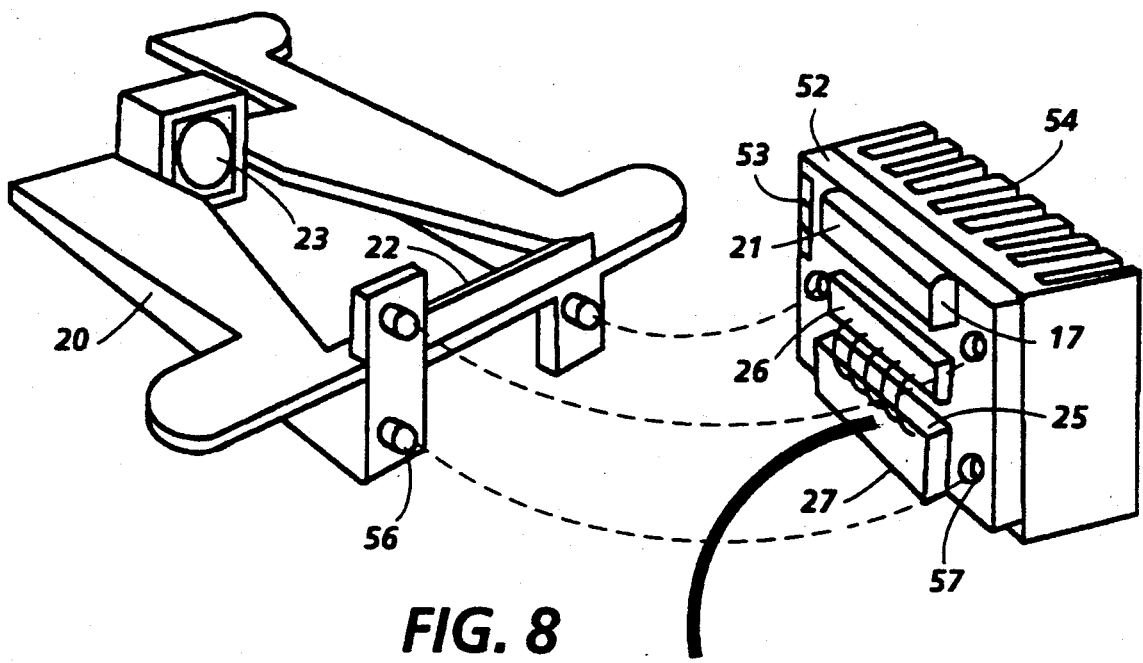
FIG. 8, is an isometric representation of the scanning carriage illustrated in FIG. 4.

The movement of the scan carriage 20 supporting image read assembly 21, 22, 23, 26 and print bar 25 is further illustrated with respect to FIG. 7. Arrows 33a and 33b illustrate the forward and reverse scan of the carriage 20 across a document and copy sheet, also shown in FIG. 2. The arrows 68 illustrate that a number of pixels, perpendicular to the direction of movement of scan carriage 22, are both read by the read assembly and printed by the print bar as the carriage scans the document and copy sheet. In a typical embodiment, 192 pixels at 300 per inch are read and printed perpendicular to the movement of carriage as it scans. In this example arrow 68 represents a band of information 0.0033 inch long and 0.64 wide which is read and printed. This enables scanning a band of information about 0.64 inches wide. The movement of the carriage can be continuous or in discrete steps, but in a preferred embodiment, the 192 pixels are read and printed in increments that are one pixel apart as shown. In one embodiment, each time the scan carriage moves a distance of one pixel width across the sheet, the electronic image of 192 pixels down the sheet are moved into a shift register and then amplified and shifted in reverse order into the print bar to fire the 192 ink jets and thereby create a print of the 192 pixels previously read. This sequence is repeated each time the scan carriage has moved a distance of one pixel width. It should be noted that the scanning could also be done with 192 parallel channels, each channel reading and writing a single line of pixels as the carriage sweeps across the page. While it is preferred that the read/write operation be substantially simultaneous it should also be noted a digital buffer or register could be incorporated to initially store the scanned or read signals for later printing after a predetermined or arbitrary time period. It should also be understood that the combined scanner illustrated has multimode capability and could be operated independently as a printer modulated by any suitable device providing digital information, operated independently as a scanner to convert source documents to a digital representation, or operated as a facsimile device using the reading and printing elements when combined with a suitable modem, or as a copier by combining the scanning and printing operations.

Figure 3:
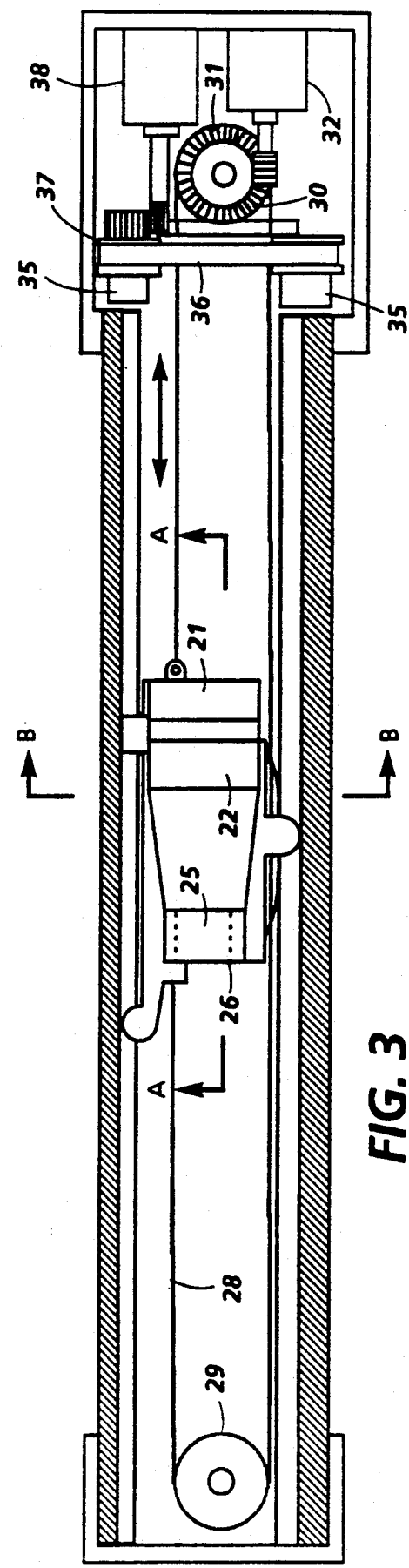
FIG. 3 is a plan view illustrating the scanning carriage system.

Following a scanning run in either direction across the length of the frame assembly the document and copy sheet are each indexed through the scanner in opposite directions a distance equal to the width of the band of information on the document scanned by the reading head which is the same as the width of the band of information printed on the copy sheet by the printing head. This width can be any width from a minimum of a single pixel line to a maximum of the width of the entire document. In practical terms, however, in order to keep the cost of the read and write components low the width of the band is of the order of a fraction of an inch to several inches wide. The method for achieving this is illustrated with further reference to FIGS. 1, 2 and 3, wherein an indexing means is provided at one end of the frame assembly comprising a pair of synchronously driven rotatable drive rolls 35 forming a feeding nip for a document with document feed idler roll 42 contained within the top cover 11 of the scanner. The term synchronously driven is intended to define only that the drive rolls 35 are synchronized to each other. The drive rolls 35 also form a feeding nip for a copy sheet with the copy sheet idler roll 46 in the copy sheet transport path. The drive rolls 35 are driven by index stepper motor 38 through gear 37 and belt 36. The scan motor 32 and the index motor 38 are controlled by logic 33 as illustrated in FIG. 4.

Figure 5:
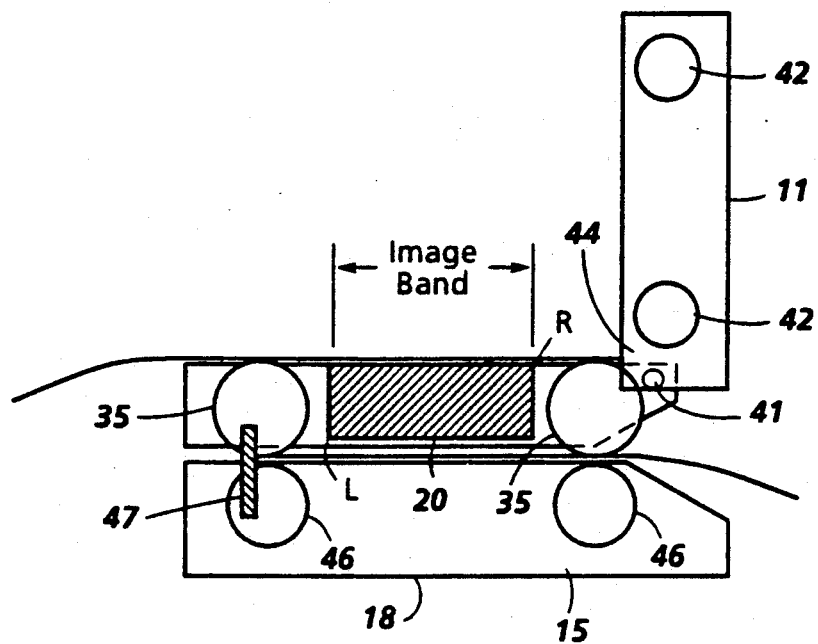
FIG. 5 is a sectional view taken along the line BB in FIG. 3 illustrating the registration mechanism for the document as well as the copy sheet according to the present invention.

With additional reference to FIG. 5, the top cover 11 is pivotally mounted to the frame assembly 15 and in particular the base unit 18 pivots about points 41. When the top cover is pivoted to the open position the document feed idler roll 42 are disengaged from the drive rolls and the registration edge 44 is inserted into the plane of the document transport path enabling the placement of a document to be copied in the scanner with its lead edge registered and inhibiting transport of the document through the document transport path. In a similar manner the copy sheet idler roll 46 in the base unit is retracted from engagement from the drive rolls 35 by linkage (not shown) when the top cover is raised to the open position. Similarly, registration gate 47 are inserted into the copy sheet transport path to enable manual registration of the copy sheet.

In a preferred embodiment the circumference of the drive rolls is equal to the width of the band of information across the document scanned by the scanning carriage to eliminate run out and shaft straightness tolerance defects which otherwise might cause some misregistration between scan widths.

Figure 1:
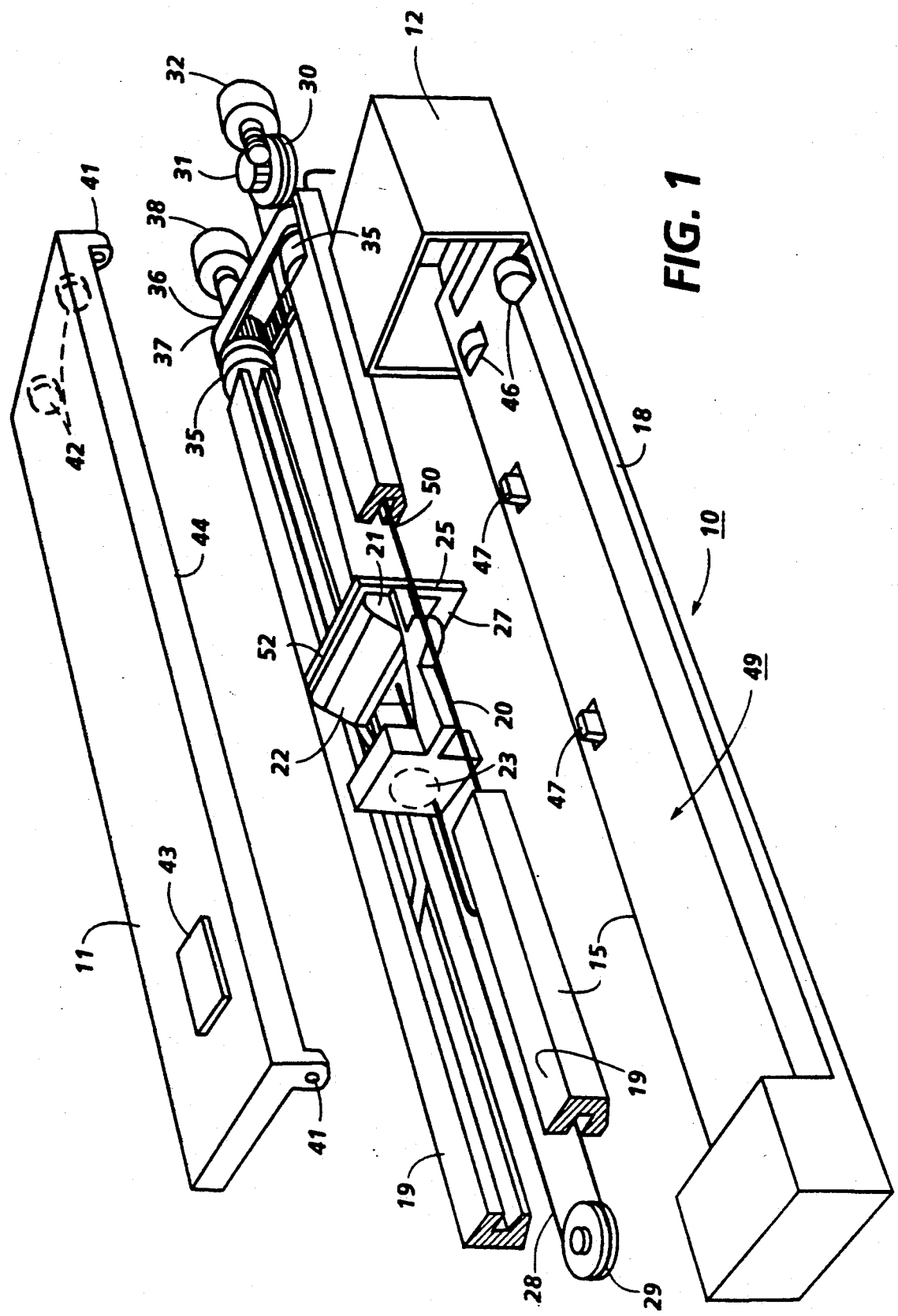
FIG. 1 is an exploded isometric view of the compact copier according to the present invention.
Figure 2:
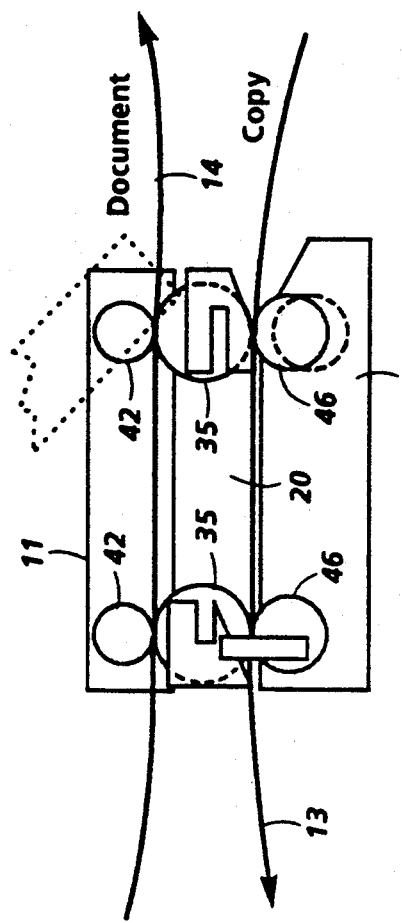
FIG. 2 is a schematic cross sectional view of the compact copier according to the present invention.
Figure 4:
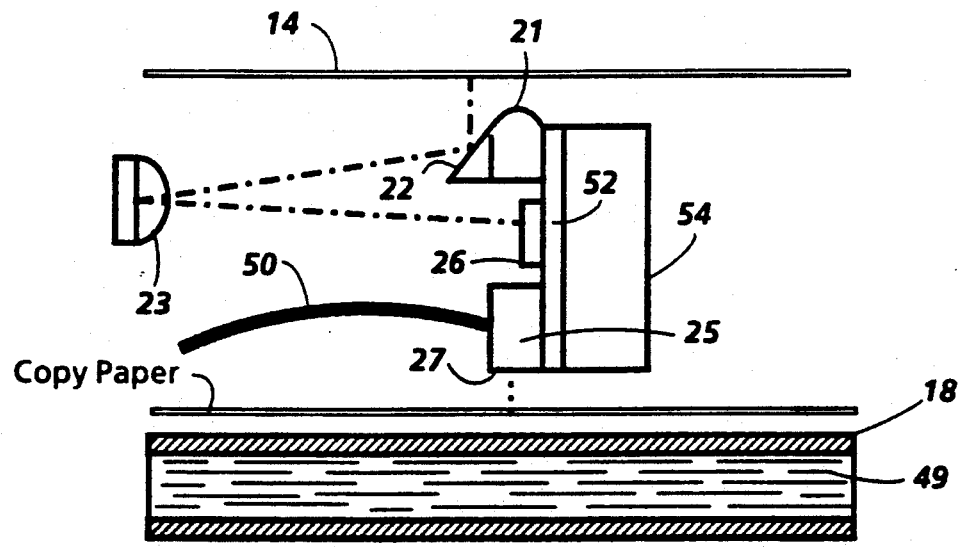
FIG. 4 is a sectional view along the line AA of FIG. 3 illustrating the elements of the scanning carriage in the present invention

As further illustrated in FIG. 4 the base unit 18 has ink supply 49 connected to the ink jet print head 27 by means of a flexible umbilical ink supply tube 50. While the scanner of the present invention may have power supplied by conventional connection to household electrical circuit FIG. 1 illustrates a preferred embodiment wherein a rechargeable battery 43 is contained within the top.

In operation when the top cover is opened the idler rolls in the document path which are mounted in the top covers are moved out of position enabling placement of the document against front registration edge which are part of the top cover assembly. Opening the top cover also causes the first incoming copy paper idler roller to disengage from its drive roller and a set of registration fingers in the copy paper path to move into the copy paper path. A copy sheet may be inserted from the right until its lead edge contacts the registration finger and a document may be inserted from the left on the top of the scanner face down. Following insertion of the copy sheet and the document the top cover is closed thereby reengaging both the copy paper and document idler rolls with the drive roll. In addition, the copy paper registration fingers are withdrawn, two sensors (not illustrated) detect that both the document and the copy paper have been loaded accordingly and the logic initiates the copying sequence. The scan carriage containing the read and write head disengages from the maintenance station and scans across the document and copy sheet while both remain stationary. The document is positioned so that its lead edge coincides with the right side pixel of the read head, and the copy paper is positioned so that its lead edge coincides with the left side pixel of the print head. This enables the formation of a right reading image on the copy sheet. A line of information on the document read on the right extreme of the image read head fires the print head on the extreme left of the printing array during the scan of the carriage 20. This may be illustrated with reference to FIG. 5. The pixel data received by the input chip at the extreme right of the chip (R); as the carriage 20 moves in the direction into and out of the paper is transmitted and amplified to modulate the print head to fire the print head at the extreme left (L) of the print head. This scheme enables the printing of right reading copies with essentially simultaneous reading and writing without information storage. As the carriage scans across both the document and the copy paper, the 0.64 inches band of information being read off the document is immediately printed onto the copy paper. When the first scan is complete the carriage motion stops. Both the document and copy paper are then indexed in a direction transverse to the scanning direction the width of the band of information previously scanned. This indexing is accomplished by driving the single pair of drive rolls which engage the document at the 12:00 position with the document feed idler rolls forming a feeding nip therebetween, and the copy paper at the 6:00 position with the copy sheet feed idler roll forming a feeding nip therebetween. The clockwise motion of the drive rolls of one revolution causes a document to be indexed 0.64 inches to the right and the copy paper to be indexed 0.64 inches to the left. In this way the second band of information from the document is moved into a position over a scan carriage and a second portion of the copy paper is moved to a position under the print head. The scan carriage scans across the document and copy paper in the reverse direction from the first scan again reading the document and immediately printing the copy. This sequence is repeated until the entire document is read and the entire copy is printed after which time the print head returns to the maintenance station and is parked. After the last scan across the document and copy paper is completed, the index motor is activated to eject the trail edge of the document to the right and the copy to the left after which the scanner returns to to the dormant state until the top cover is again opened and closed to reinitiate the next copy sequence.

Figure 9:
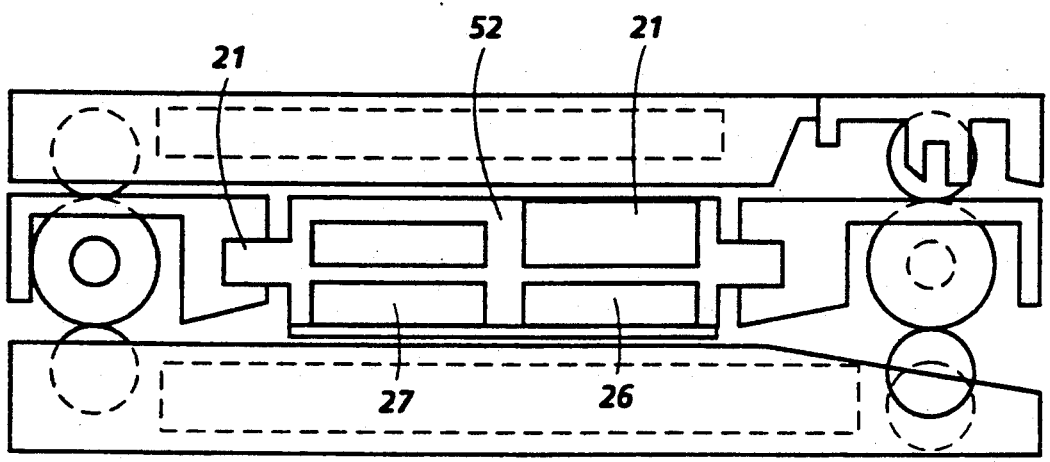
FIG. 9 is a view in cross section illustrating an embodiment wherein the input chip and the output chip are comounted in a horizontal array in a vertical plane.

Attention is directed to FIG. 9 for an alternative embodiment where the input chip 26 and printing chip 27 are comounted in a horizontal array to planar vertical substrate 52 at the front or rear of the scanning carriage as it moves into and out of the Figure.

Figure 10:
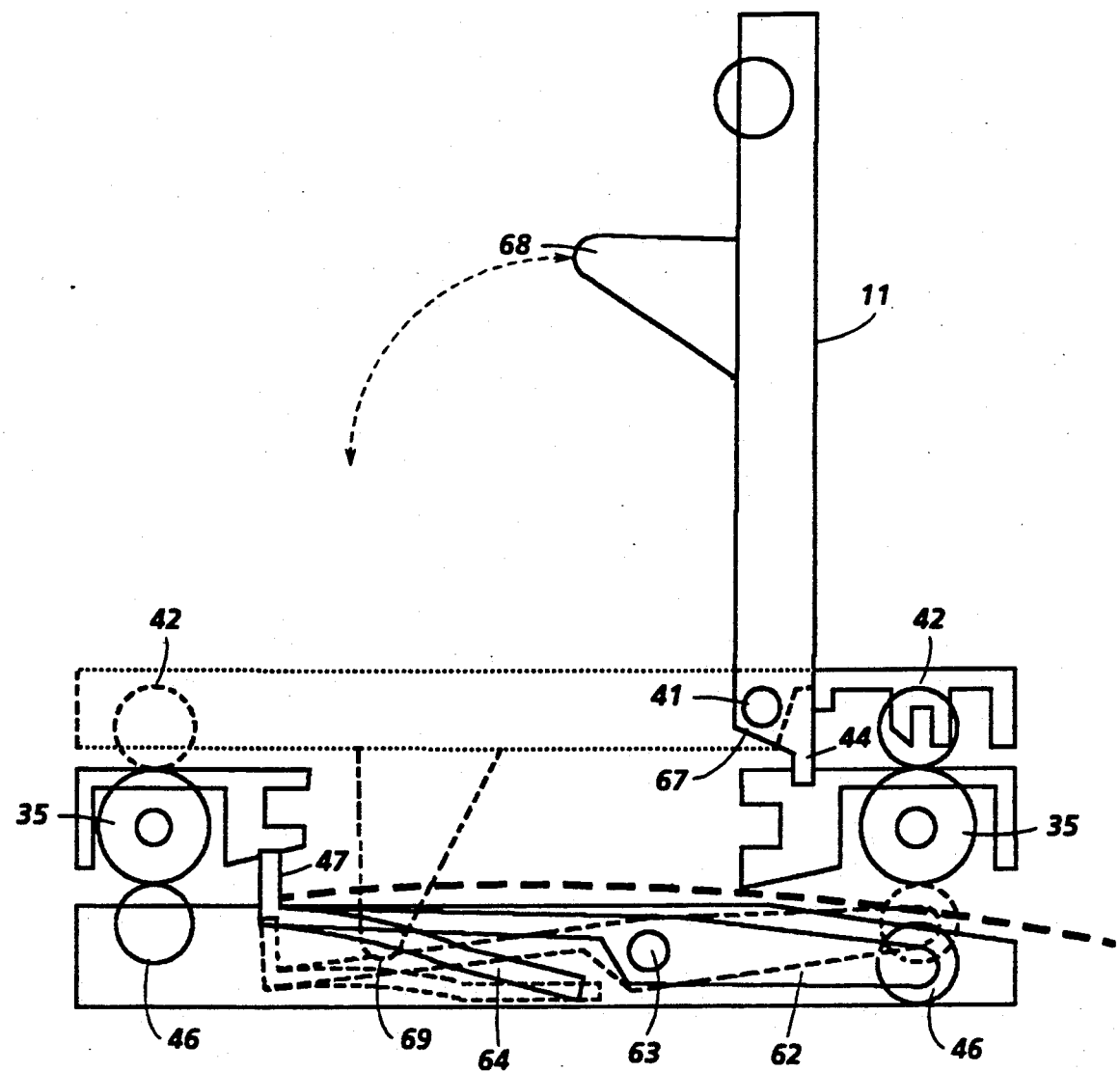
FIG. 10 is an enlarged view of FIG. 2 illustrating in cross section the copy sheet and document registration device according to the present invention.
Figure 11:
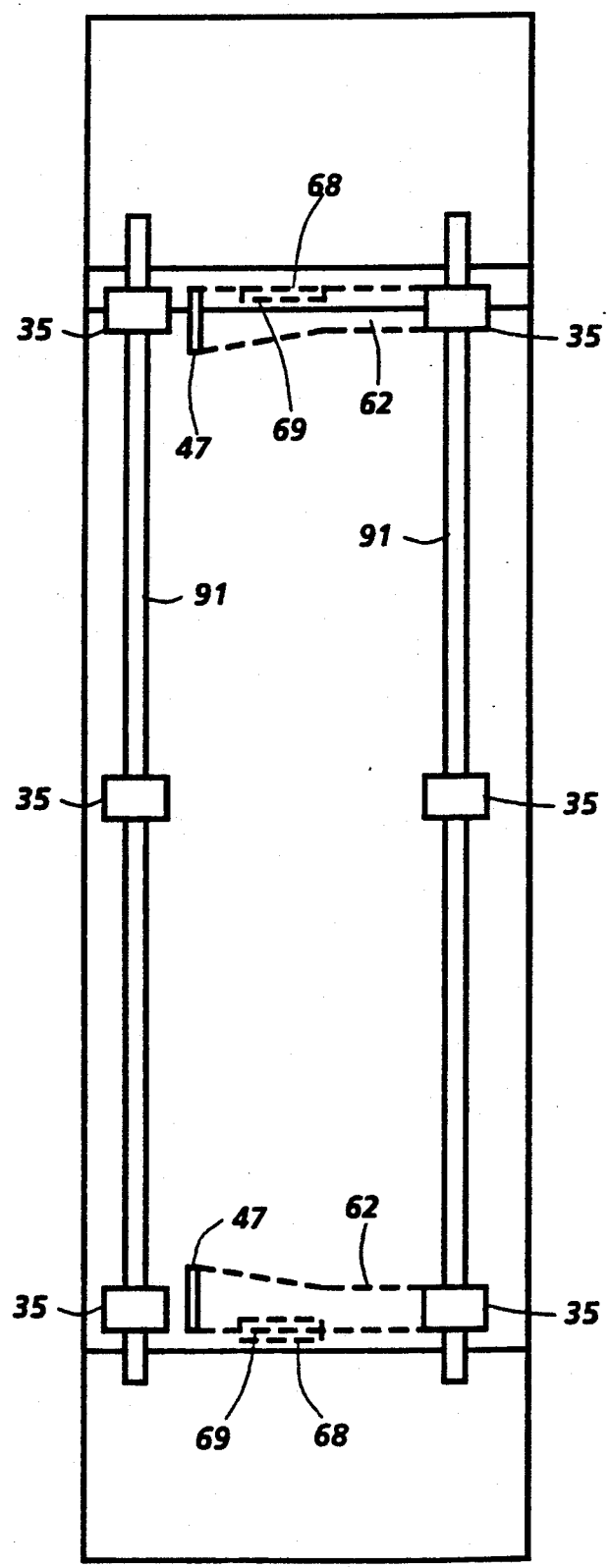
FIG. 11 is a top view of an alternate embodiment illustrating activation of the copy sheet registration gate.

With continued reference to FIGS. 1-9 and additional reference to FIGS. 10 and 11 the document registration system and copy sheet registration system will be described in further detail. FIG. 11 illustrates an alternative embodiment of the paper and document drive roll mechanism wherein two drive roll shafts 91 extend across the width of the document and paper paths, positioned above the copy paper path and below the document path. Each shaft has mounted therein multiple drive rolls 35. The document registration gate 44 is an integral part of the top cover 11. By the term integral part it is contended to define a single piece such as a one piece molded plastic as well as a separate gate which is fixedly attached to the cover. The top cover is pivotally mounted about pivot points 41 exposing a taper 67 when in the open position. Thus, when the top lid is open a document may be inserted from the left and its lead edge registered against the document registration gate 44. The copy sheet registration gate 47 is provided in the copy sheet transport path on the end of an arm 62 which is pivotally mounted about pivot points 63 and normally urged upwardly by means of spring 64. At the opposite end of the arm 62 is the copy sheet feed idler roll 46 which forms the feeding nip with the drive roll 35. The top cover 11 has a tab 68 which when in the closed position engages copy sheet registration gate tab 69 which forces the retraction of the copy sheet registration gate 47 against the force of the spring 64 and as the arm 62 pivots about pivot 63 it urges the copy sheet feed idler roll 46 into a nip forming a feeding nip with drive roll 35. Accordingly when the top cover is opened the spring which may be an integrally molded spring on the arm pushes the copy paper registration gate up and rotates the lower right idler roll down so the operator can slide the copy paper into the slot and register it against the registration gates. Similarly, with the top cover up a document may be guided into registration against document registration gates 44. When the top cover is closed the document registration gate rotates up and away from the document and the tab on the top cover pushes the copy sheet registration gate down and engages the copy sheet feed idler roll with the drive roll.

Accordingly by the present invention an architecture of a copier has been provided which includes a very simple registration system for both the document and copy sheet. In particular virtually simultaneous registration of the document and copy sheet without complex costly electromechanical actuators has been provided. The registration of both the document and the copy sheet is achieved with only very simple economical mechanical means.

All the patents and other references together with the cross reference copending applications are hereby and specifically totally incorporated in their entirety into this specification.

While the invention has been described with references specific embodiments thereof it will be apparent to those skilled in the art that many alternatives modifications and variations may be made. For example while the invention has been illustrated with respect to having an indexing mechanism for the document and copy sheets on only one side of the scanner it will be appreciated that a similar indexing mechanism may be provided on the opposite side of the scanner. Accordingly it is intended to embrace all such alternatives and modifications as may fall in the spirit of the appended claims.

I claim:

1. A combined input and output scanner comprising a frame assembly, a document transport means to transport a document through the scanner in a document transport path in a first direction and, a copy sheet transport means to transport a copy sheet through the scanner in a copy sheet transport path, document registration means and copy sheet registration means, said document registration means including a cover pivotally mounted on said scanner for movement between an open and closed position over said document transport path, said cover having at least one integral document registration gate associated therewith which extends into the document transport path to register the lead edge of a document when the cover is in the open position.

2. The scanner of claim 1 wherein said copy sheet registration means includes at least one copy sheet registration gate positioned in the copy sheet transport path, said at least one copy sheet registration gate being normally urged into the copy sheet transport path to register the lead edge of a copy sheet when said cover is in the open position, said cover having means associated therewith for removing said at least one copy sheet registration gate from said copy sheet transport path when said cover is in the closed position over said document transport path.

3. The scanner of claim 2 wherein said cover is pivotally mounted at the downstream end of the document transport path and said integral document registration gate is adjacent said covers downstream end.

4. The scanner of claim 2 wherein the copy sheet transport path is in a direction opposite said direction of document transport and said at least one copy sheet registration gate is positioned at the downstream end of the copy sheet transport path.

5. The scanner of claim 2 wherein said at least one copy sheet registration gate is spring biased into the copy sheet transporth path.

6. The scanner of claim 3 wherein said cover is pivotally mounted at the downstream end of the document transport path and said integral document registration gate is adjacent said covers downstream end.

7. The scanner of claim 6 wherein the copy sheet transport path is in a direction opposite said direction of document transport and said at least one copy sheet registration gate is positioned at the downstream end of the copy sheet transport path.

8. The scanner of claim 2, wherein said at least one copy sheet registration gate has a positioning tab and said means associated with said cover comprises at least one positioning tab on said cover for engagement with said positioning tab on said copy sheet registration gate when said cover is in the closed position to remove said at least one copy sheet registration gate from said copy sheet transport path.

9. The scanner of claim 2 wherein said document transport and copy sheet transport include a first pair of synchronously driven rotatable drive rolls each drive roll forming a feeding nip for a document with a document feed idler roll and a feeding nip for a copy sheet with a copy sheet feed idler roll.

10. The scanner of claim 9 wherein the document feeding nip is on top of the drive roll and the copy sheet feeding nip is at the bottom of the drive roll.

11. The scanner of claim 9 wherein the copy sheet feed idler roll in the upstream end of the copy sheet transport path is mounted on an arm for pivotal movement toward one of said drive rolls forming a feeding nip therebetween and away from said one drive roll to enable insertion of a copy sheet therebetween.

12. The scanner of claim 11 wherein said copy sheet feed idler roll is rotatably mounted on one end of said arm and said at least one copy sheet registration gate is mounted on the other end of said arm and said arm is pivotally mounted between said idler roll and registration gate for alternate insertion of said registration gate in said copy sheet transport path and engagement of said copy sheet feed idler roll with said drive roll.

13. The scanner of claim 2 including a carriage movably mounted in said assembly for scanning movement in a scanning path in a direction transverse to said first and opposite directions; and said scanning carriage including a comounted reading head secured thereto for scanning a document to produce a digital image of a least portion of the document and a printing head secured thereto for relative movement with respect to a copy sheet and electronically connected to said reading head for printing said digital image on said copysheet.

14. The scanner of claim 13 wherein when said carriage scans a document the reading head scans a band of information across the document and the printing head essentially simultaneously prints the same band of information across a copy sheet and upon completion of said scanning movement said document transport and said copy sheet transport simultaneously index the document and copy sheet through their respective paths a distance equal to the width of said band of information before said carriage scans another band of information across the document.

15. The scanner of claim 14 wherein the drive rolls have a circumference equal to the width of the band of information.

16. The scanner of claim 13 wherein said reading and printing occur essentially simultaneously without information storage.

17. The scanner of claim 13 wherein said carriage is mounted for bidirectional scanning movement in said frame assembly.

18. The scanner of claim 13 wherein the right side pixel of the read head coincides with the lead edge of a portion of a document to be copied and the left side pixel of the print head coincides with the lead edge of the print of said portion on a copy sheet to form a right reading image on the copy sheet.

19. The scanner of claim 17 wherein said document transport path is above said copy sheet transport path said reading head and printing head are comounted on said scanning carriage for essentially simultaneously reading a document face side down in said document transport path and printing a digital image face side up on a copy sheet.

20. The scanner of claim 13 wherein said reading head includes an input chip and said printing head includes an output chip said input and output chips being comounted in the same plane to the same planar substrate.

21. The scanner of claim 20 wherein said output chip is a thermal ink jet array.

22. The scanner of claim 9 wherein the document feed idler rolls are mounted in the cover.

23. The scanner of claim 20 wherein the input chip and output chip are comounted in a horizontal array in a vertical plane.

24. The scanner of claim 20 wherein said output chip is a direct thermal print head.

25. The scanner of claim 20 wherein said output chip is a thermal transfer print head.

26. A combined input and output scanner comprising a frame assembly, a document transport means to transport a document through the scanner in a document transport path, a copy sheet transport means to transport a copy sheet through the scanner in a copy sheet transport path, document registration means and copy sheet registration means said document registration means including a cover pivotally mounted on said scanner for movement between an open and closed position over said document transport path, said copy sheet registration means including at least one copy sheet registration gate positioned in the copy sheet transport path, said at least one copy sheet registration gate being normally urged into the copy sheet transport path to register the lead edge of a copy sheet when said cover is in the open position, said cover having means associated therewith for removing said at least one copy sheet registration gate from said copy sheet transport path when said cover is in the closed position over said document transport path.

* * * * *